United States Patent [19]

Kando et al.

[11] Patent Number: 5,608,883
[45] Date of Patent: Mar. 4, 1997

[54] ADAPTER FOR INTERCONNECTING SINGLE-ENDED AND DIFFERENTIAL SCSI BUSES TO PREVENT 'BUSY' OR 'WIRED-OR' GLITCHES FROM BEING PASSED FROM ONE BUS TO THE OTHER

[75] Inventors: Robert R. Kando, Woburn; Paul L. Godin, Bedford, both of Mass.

[73] Assignee: Digital Equipment Corporation, Maynard, Mass.

[21] Appl. No.: 12,484

[22] Filed: Feb. 1, 1993

[51] Int. Cl.⁶ .................................................. G06F 13/00
[52] U.S. Cl. ..................... 395/309; 395/308; 395/200.01; 395/872; 370/465; 364/240.2; 364/240.5; 364/242.5; 364/DIG. 1
[58] Field of Search ..................... 395/800, 725, 395/325, 550, 200, 200.13, 200.15, 200.2, 885, 872, 308, 309, 200.01; 375/7, 59, 75; 370/85, 85.9, 123, 124; 340/825.5, 825.08

[56] References Cited

U.S. PATENT DOCUMENTS

4,779,089 10/1988 Theus ................................... 340/825.5
5,179,704 1/1993 Jibbe et al. ............................. 395/725
5,274,678 12/1993 Ferolito et al. ......................... 375/108

Primary Examiner—Alyssa H. Bowler
Assistant Examiner—Alpesh M. Shah
Attorney, Agent, or Firm—Krishnendu Gupta; Ronald C. Hudgens

[57] ABSTRACT

A SCSI adapter for interconnecting first and second SCSI buses includes a filter for preventing BUSY glitches from being passed from one bus to the other. The filter includes a shift register connected to NAND logic. The SCSI adapter also has a circuit for establishing a desired timing relationship between DATA signals received over the first bus and corresponding ACK or REQ signals also received over that bus that indicate whether the DATA signals are valid. The circuit includes a DATA latch responsive to a delayed version of the ACK or REQ signal received at a clock input thereof. The output of the latch and the corresponding delayed ACK or REQ are transmitted over the second bus.

6 Claims, 5 Drawing Sheets

ADAPTER FOR INTERCONNECTING SINGLE-ENDED AND DIFFERENTIAL SCSI BUSES TO PREVENT 'BUSY' OR 'WIRED-OR' GLITCHES FROM BEING PASSED FROM ONE BUS TO THE OTHER

FIELD OF THE INVENTION

The invention relates to communication interfaces of the type used to connect a digital computer to peripheral devices, and more particularly to adapters that interconnect single-ended and differential buses over which the digital computer and peripheral devices communicate.

BACKGROUND OF THE INVENTION

A known type of bus adapters interconnect SCSI buses, e.g., single-ended SCSI buses with differential SCSI buses. SCSI buses obtain their name by complying with the Small Computer System Interface ("SCSI") standards of the American National Standards Institute, New York, N.Y., USA, designated ANSI X3T9.2/86–109, Rev. 10H and X3T9/89–042.

Generally speaking, the SCSI standards specify the electrical, mechanical and logical characteristics of the SCSI bus, which is an eight-bit parallel input/output (I/O) bus. A SCSI bus can be used for coupling physically small computers with each other and with peripheral devices; up to a total of eight devices (including the computers) can be connected to the bus. The peripheral devices can include, for example, disk drives, tape drives, printers, compact disk read-only memories ("CD-ROM's"), and scanners.

The SCSI standards specify a distributive bus protocol, which facilitates information transfers between devices connected to the bus. Generally speaking, the bus protocol refers to the host computers on the bus as "initiators" and the peripheral devices on the bus as "targets". The initiators are capable of initiating operations on the bus, and the targets are capable of responding to the initiators to perform operations. The SCSI standards also specify an arbitration system, under which control of the bus is awarded to the device on the bus having the highest priority level of those contending for control.

The bus protocol includes an addressing scheme for identifying the initiators and targets, and specifies control signals used to control operation of the SCSI bus, and to establish communication links between the initiators and targets for information transfers on the bus.

The control signals are asserted over specified "lines" of the SCSI bus, and include, among others, the following:

1) BUSY or "BSY" (which, when asserted, indicates that the bus is in use, i.e., busy or not "free"), 2) REQUEST or "REQ" (which is used by a target to indicate a request for a data information transfer between the initiator and the target, i.e., when asserted by a target, the initiator is to accept data from the bus during an information-in-phase, or place data on the bus during an information-out-phase), 3) ACKNOWLEDGE or "ACK" (which, when asserted, indicates that data information sent over the bus is valid, i.e., when asserted, the initiator has placed data information on the bus during an information-out-phase, or has accepted data from the bus during an information-in-phase).

In addition to the control lines, the initiators and targets use a bi-directional, eight-bit, parallel DATA bus (i.e., DATA lines of the SCSI bus) to transfer data information. The DATA lines are also used to transfer SCSI ID codes that uniquely identify the devices on the SCSI bus, and specify their relative priority during arbitration.

SCSI buses can be either "differential" or "single-ended". A single-ended configuration uses a single conductor or cable of up to six meters in length for each signal line, and the voltage level on that conductor determines the assertion or deassertion of that line. Accordingly, each device connected to a single-ended bus typically has, for each signal line, a driver with a single output terminal connected to that conductor, and a receiver with a single input terminal connected to that conductor.

A differential configuration uses a pair of conductors or cables of up to 25 meters in length for each signal line, and the voltage difference between those conductors (referenced to ground) determines the assertion or deassertion of that line. Accordingly, each device connected to a differential bus typically has, for each signal line, a driver with a pair of output terminals connected to the differential conductors, and a receiver with a pair of input terminals connected to the differential conductors (plus., in each case, a ground terminal conducted to a ground path).

While known adapters for interconnecting single-ended and differential SCSI buses have been generally suitable for their intended purposes, they can experience problems during operation, such as the so-called "wired-or glitch." This problem will be discussed in the context of the BUSY line, thus the name "BUSY glitch."

To understand the BUSY glitch, it is necessary to consider normal operation of the SCSI bus, when, for example, two or more devices attempt to gain access to the SCSI bus at the same time by arbitrating for .its control. The devices do so by asserting the BUSY line of the bus. In accordance with the SCSI standards, which specify negative logic, the contending devices drive the BUSY line of a single-ended bus to a low voltage state ("LOW"), or drive the $BSY^+$ conductor more positive than the BSY conductor of the BUSY line of a differential bus, and assert selected other lines indicating the respective priority levels.

Since only one device can gain control of the SCSI bus at a time, the devices "losing" the arbitration will deassert the BUSY line, and thus drop off the bus. When they deassert the BUSY line, a current differential arises, which results in a voltage wavefront traveling the length of the line. When the wavefront reaches the other end, it is reflected back. This wavefront is called a BUSY glitch.

The wavefront is essentially a voltage pulse or "step". The voltage step can be of sufficient magnitude to cause a false high voltage state ("HIGH") on the BUSY line, i.e., using the negative logic of the SCSI standards, the line will falsely appear to be deasserted at any point along the line until the reflection reaches that point. The false or invalid deassertion of the BUSY signal can "fool" other devices on the bus into "believing" that the bus is free when it is not, thereby adversely affecting bus operation.

The wired-or glitch is more fully described in "SCSI BUS SIGNAL QUALITY—PROBLEMS AND SOLUTIONS", by Kurt Chan, Hewlett-Packard, Reprinted for Zadian Software, August, 1990.

In order to avoid the adverse effects of the BUSY glitch, the SCSI standards contemplate that the devices on the SCSI bus should wait before they again seek control of the SCSI bus for a length of time after first detecting a BUSY glitch equal to that required for the waveform to make a round trip on the bus, which depends on the length of the bus.

The SCSI specifications specify also that the maximum propagation time for the BUSY glitch is 400 nanoseconds.

Normally, for the most basic of SCSI bus system configurations, this maximum time specification to avoid BUSY glitches presents no difficulty to SCSI-device designers. For example, if the SCSI bus is 25 meters long (i.e., the maximum differential bus length under the standards), a glitch typically will travel down and back the length of the bus in 250 nanoseconds, which is well under the requirement.

However, introduction of an adapter between a single-ended and a differential bus can change the picture. If the differential bus is 25 meters in length, and the single-ended bus is three meters long, the round trip time of travel is 280 nanoseconds. The adapter adds typically a 50 nanosecond delay in each direction, yielding a total which is just barely under the 400 nanosecond limit. If there are additional delays, for example, due to connectors and other components of the system, the total delay would typically exceed the limit.

The situation is even more extreme when two adapters are used, e.g., each connected to a 25-meter differential bus and the two adapters linked by a three-meter single-ended bus. The resulting delay would typically be significantly in excess of the limit under the SCSI standards.

It would be desirable to prevent the adapter from transferring the BUSY glitch from one bus to the other, thereby facilating complying with the SCSI standards.

Another drawback with conventional adapters is their rather low operating speeds, e.g., under five mega-Hertz. This translates directly into low data transfer rates of no more than five megabytes per second. It would be desirable to operate adapters at faster speeds, e.g., ten mega-Hertz, in order to increase through-put. The capability of operating at increased speed and through-put is becoming even more important as more complicated arrangements of peripherals are being connected to the SCSI buses, e.g., using master or "juke-box" controllers.

Unfortunately, operational difficulties that may be managable at the lower speeds can become significant when the adapter is operated at higher speeds. For example, the time relationship of the DATA information transfers on the DATA lines to the assertion of ACK or REQ (which indicate that the data is valid) can become skewed, and buses operating at higher speeds are less tolerant of such skews. This can result in valid DATA being missed or invalid DATA being indicated as being valid. Clearly, this is a most undesirable situation that, unremedied, would constrain the adapter to operating at lower speeds.

SUMMARY OF THE INVENTION

The invention resides in a SCSI adapter for interconnecting two SCSI buses (e.g., a single-ended with a differential bus), which filters out or suppresses deassertions of the BUSY signal that last under a predetermined length of time in order to prevent BUSY glitches from being transferred from one bus to the other. As a result, the adapter reduces the likelihood of devices on the "other" bus detecting "false" deassertions of the BUSY signal.

In accordance with this aspect of the invention, the BUSY signal path through the adapter includes a filter arrangement that "transfers" the BUSY signal selectively, as follows: i) whenever the BUSY line is asserted on a first of the buses, the assertion is immediately passed onto the other of the buses; ii) whenever the BUSY line next becomes deasserted on the first bus, the deassertion is delayed before it is passed onto the other bus for a selected length of time approximately equal to the maximum length of time for the wavefront of a BUSY glitch to travel twice (round-trip) the length of the bus; and iii) whenever the BUSY signal deassertion does not continue for that selected length of time, then the filter arrangement does not pass the deassertion at all.

Accordingly, put another way, the filter arrangement is transparent to assertions, i.e., leading edges, of the BUSY signal, and filters the deassertions, i.e., trailing edges, by delaying the transfer of the deassertions until it is clear that they are not "false" deassertions.

A preferred implementation for the filter arrangement comprises a shift register that receives the BUSY signal from the first bus, and a NAND circuit that receives the outputs of the shift register stages to generate the BUSY signal on the other bus.

During operation, while the BUSY signal applied to the shift register is deasserted, all of the outputs of the shift register are at DIGITAL ONE, and the output of the NAND gate is DIGITAL ZERO, SO the BUSY signal is not asserted on the second bus. When the BUSY signal becomes asserted on the first bus, the shift register has a DIGITAL ONE at a first output terminal and a DIGITAL ZERO at all the rest. The output of the NAND gate goes to DIGITAL ONE, and the BUSY signal is caused to be asserted on the second bus.

If the BUSY signal on the first bus becomes deasserted again (i.e., returns to a DIGITAL ONE), the shift register will continue to have a DIGITAL ZERO on at least one of its output terminals until the DIGITAL ONE input has propagated through all its "positions" (i.e., has been applied to all the output terminals of the shift register), and so the NAND will continue to assert the BUSY signal on the second bus. If the BUSY signal is re-asserted before the DIGITAL ONE has propagated through all the positions of the shift register, the prior deassertion will never appear on the second bus.

In accordance with another aspect of the invention, the SCSI adapter establishes a desired timing relationship of the DATA signals with the corresponding ACK and REQ signal that indicates the validity of those DATA signals. For this, the adapter includes a DATA latch that passes the DATA signals from a first bus onto the other on the assertion of a clock signal, and effectively holds the immediately prior state of DATA signal during the time the clock signal is deasserted.

Under the SCSI standards, the contents of the DATA signal are valid only when the ACK or REQ signal is asserted, and thus any change of state in the DATA signal during clock signal deassertion is of no consequence. The clock signal is a delayed version of the ACK or REQ signal received with the corresponding DATA signal over the first bus. The output of the latch, i.e., the new DATA signal, and the corresponding delayed ACK or REQ are transmitted over the second bus.

The new DATA signal and the delayed ACK or REQ signals have a timing relationship that assures that the new DATA signals will be recognized as valid. The difference between the time of assertion of the new DATA signal and the time of assertion of the corresponding delayed ACK or REQ signals can be called the "skew" and is preferably equal to approximately 35 nanoseconds. This selected length of time assures that only valid data will be indicated as valid by the corresponding ACK or REQ signals.

BRIEF DESCRIPTION OF THE DRAWINGS

For a fuller understanding of the nature and objects of the invention, reference should be made to the following detailed description, taken in conjunction with the accompanying drawings, in which.

DETAILED DESCRIPTION OF AN ILLUSTRATIVE EMBODIMENT

Figure 1:
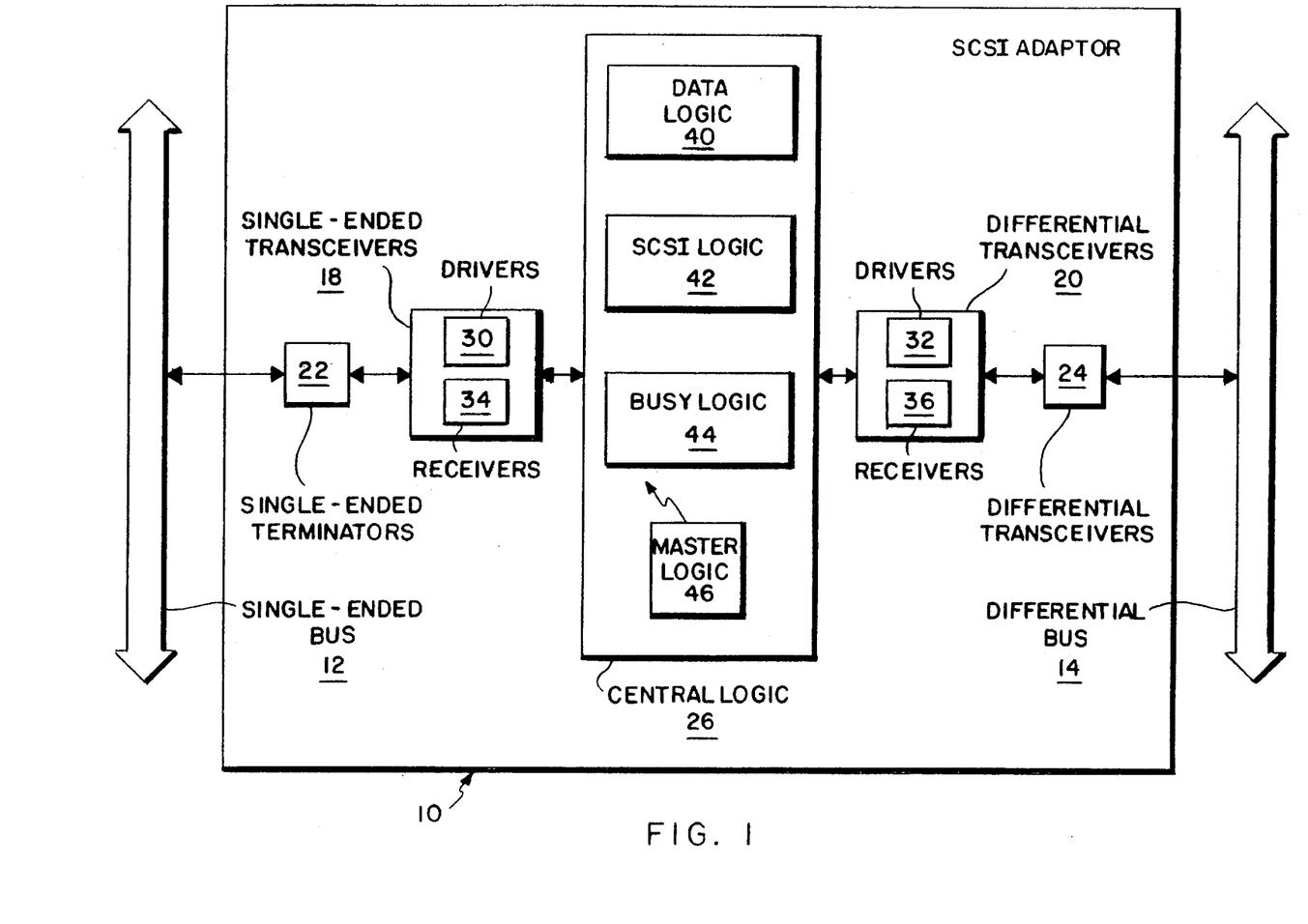
FIG. 1 is a block diagram of a SCSI adapter for interconnecting a single-ended and differential buses in accordance with the invention.

FIG. 1 shows a bus adapter 10 in accordance with the invention for interconnecting a single-ended ("SE") bus 12 and a differential ("DIFF") bus 14. The bus adapter 10 preferably interconnects the buses 12, 14 such that they operate under the standards as a single SCSI bus. Accordingly, the bus adapter 10 does not occupy a separate bus address, does not have a separate SCSI ID code, and can not arbitrate for control of the buses. Rather, it is responsible for transferring signals from one bus 12, 14 onto the other bus, while modifying certain of the signals in accordance with the invention.

The bus adapter 10 includes a plurality of single-ended transceivers 18 and differential transceivers 20 connected with the lines (not separately shown) of the single-ended and differential buses 12, 14 by respective single-ended and differential terminators 22, 24. The bus adapter 10 also has central logic 26, e.g., state machines, for executing the protocol of the adapter 10, as described herein.

The transceivers 18, 20 each include a plurality of drivers 30, 32 for driving the lines of the buses 18, 20 and a plurality of receivers 34, 36 for detecting the state of the lines (i.e., assertion or deassertion).

The central logic includes a DATA logic unit 40, a SCSI control logic unit 42, a BUSY logic unit 44, and a master logic unit 46 for controlling the operation of the other logic units 40–44. The DATA logic unit 40 is connected to the DATA lines of the buses 12, 14, and will be described in more detail below. The SCSI control logic unit 42 executes a program to effect the SCSI bus protocol, e.g., including the assertion and deassertion of standard SCSI control lines, e.g., SELECT, RESELECT, ATTENTION, C/D, and I/O. These signals are passed from one bus 12, 14 to the other bus 14, 12, preferably without modification or inserted delays. The master logic unit 46 generates clock signals from received ACKNOWLEDGE and REQUEST signals for controlling the timing of the operations of the other logic units 40–44.

Figure 2:
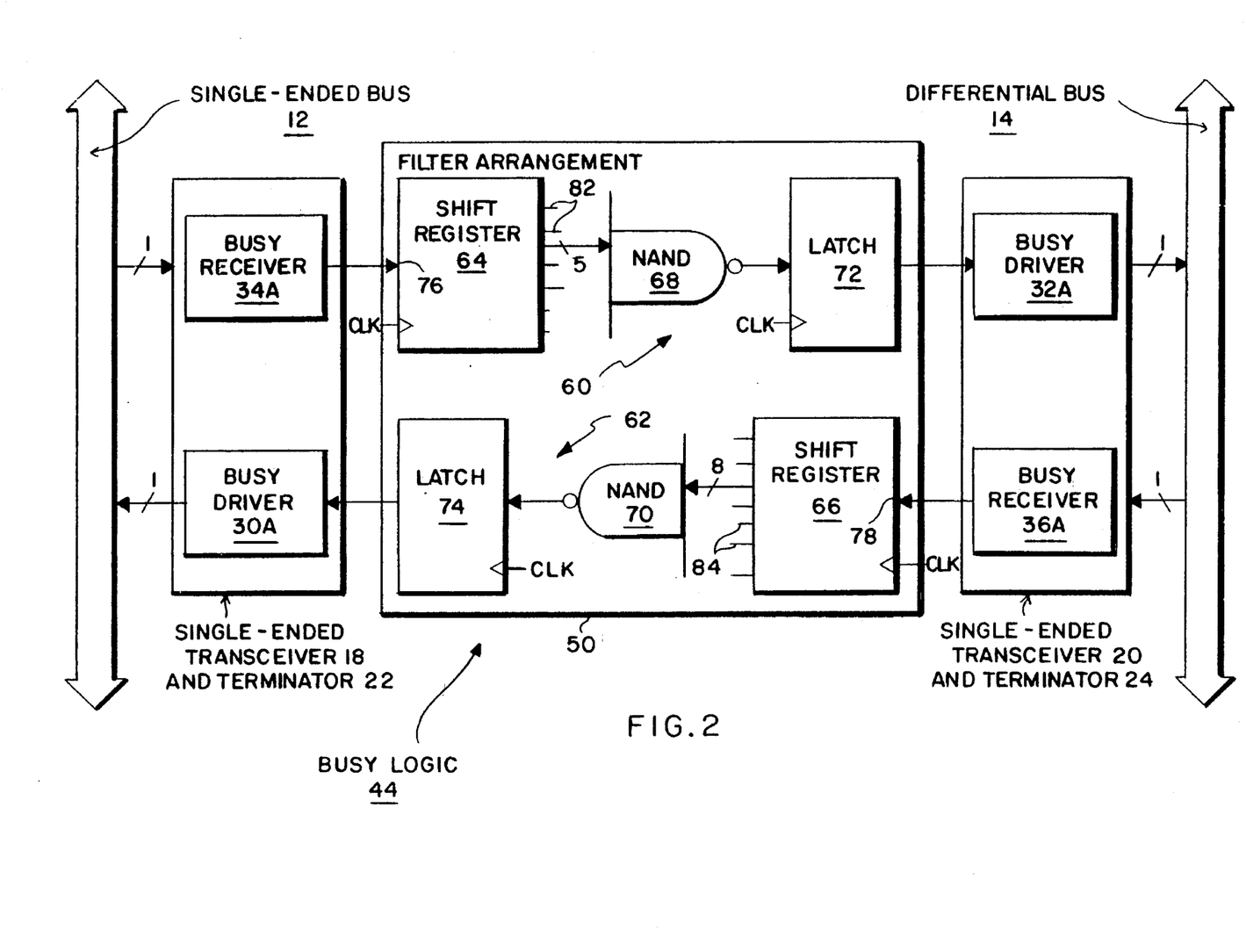
FIG. 2 is a block diagram of the BUSY signal path of FIG. 1, showing a busy glitch filter arrangement.

In accordance with a first aspect of the invention, and as shown in FIG. 2, the BUSY logic unit 44 includes a filter arrangement 50 connected between the transceivers 18A, 20A for the BUSY lines of the buses 12, 14 (specifically, between SE-BUSY receiver 34A and DIFF-BUSY driver 32A and between DIFF-BUSY receiver 36A and SE-BUSY driver 30A, respectively). The operation of the filter arrangement 50 is essentially as follows: whenever the BUSY line is asserted on one of the buses 12, 14, the filter arrangement 50 causes the assertion of the BUSY line on the other of the buses 14, 12; and whenever the BUSY line next becomes deasserted on the first bus 12, 14, the filter arrangement 50 causes the assertion on the BUSY line of the other bus to continue for a selected length of time equal to a "preset delay".

The preset delay is selected to be sufficient to overcome the effects of the BUSY glitch, and thus is selected to be approximately the maximum length of time for the wavefront of a BUSY glitch to travel the length of the bus, round trip. Since that depends on the maximum length of the bus, and that is different under the standards depending on whether the bus is differential or single-ended, the preset delay depends on the "direction" of the original BUSY line assertion, as follows:

1) if the BUSY line is asserted originally on the single-ended bus, the preset delay is selected to be, e.g., 225 to 275 nanoseconds (consequently, the filter arrangement 50 causes the BUSY line of the differential bus 14 to be asserted 225 to 275 nanoseconds after the BUSY logic unit 44 detects the assertion of the BUSY line on the single-ended bus, if it lasts that long); and 2) if the BUSY line is asserted originally on the differential bus, the preset delay is selected to be, e.g., 325 to 375 nanoseconds (consequently, the filter arrangement 50 causes the BUSY line of the single-ended bus 14 to be asserted 225 to 275 nanoseconds after the BUSY logic unit 44 detects the assertion of the BUSY line on the differential bus, if it lasts that long).

An important feature of this invention is that, if the deassertion does not continue for the duration of the preset delay, the deassertion of the BUSY signal is not passed onto the other bus.

Figure 3:
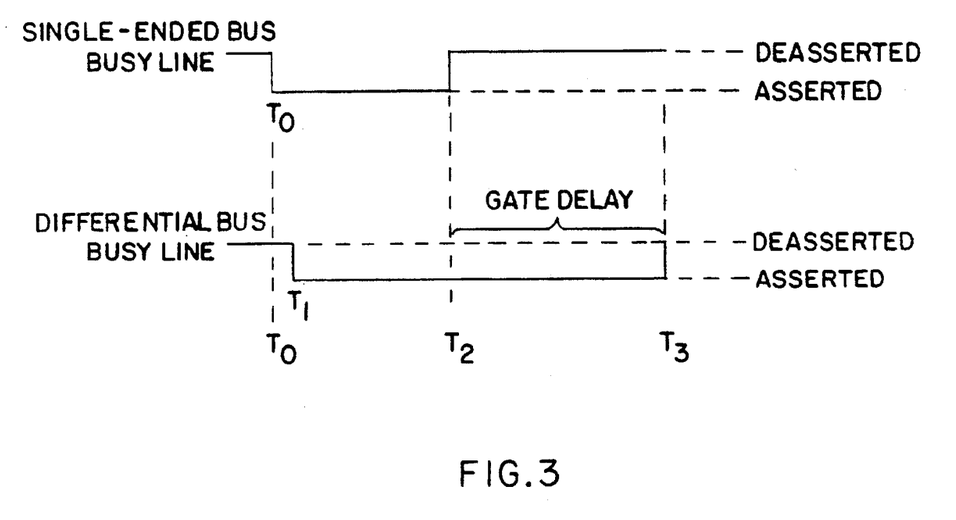
FIG. 3 and 4 are signal timing diagrams for the filter arrangement of FIG. 2.

The signal diagrams of FIG. 3 illustrates the effect of the filter arrangement 50 on a busy glitch. When the BUSY line on an originating bus, in this case, e.g., the single-ended bus 12, is asserted at time t0, the BUSY logic unit 44 causes the BUSY line on the differential bus 14 to be asserted shorted thereafter, e.g., at time $t_1$ (where $t_1=t_0$ plus an insignificant delay of about 70 nanoseconds, attributed, e.g., to the electrical components in the BUSY logic unit 44 and BUSY-line terminators 22, 24).

Then, when the BUSY line on the single-ended bus 12 is deasserted at time $t_2$, the filter arrangement 50 causes the BUSY line of the differential bus 14 to continue to be asserted for an additional length of time, e.g., 250 nanoseconds, until $t_3$. Accordingly, the BUSY signal remains asserted for an additional time on the non-originating bus to prevent untoward effects of a BUSY glitch from occurring.

Preferably, the filter arrangement 50 delays the response time of the adapter 10 (i.e., the assertion of the BUSY signal on the non-originating bus) only during deassertion ("trailing" edge) of the BUSY line of the originating bus. In order to maintain maximum speed and throughput, the filter arrangement 50 does not substantially delay the assertion of the BUSY signal on the non-originating bus following assertion of that signal on the originating bus.

As shown in FIG. 2, the filter arrangement 50 in accordance with a preferred embodiment includes a first delay path 60 for the SE-to-DIFF bus direction and a second delay path 62 for the DIFF-to-SE bus direction. The first and second delay paths 60, 62 have the same components, namely, for each, a shift register 64, 66, a NAND gate 68, 70 and a latch 72, 74.

The shift register 64, 66 receives the BUSY signal at an input terminal 76, 78 from the respective BUSY receiver 34A, 36A, and applies it to a first of a plurality of output terminals 82, 84. Then, at each tick (e.g., 50 nanoseconds) of a clock signal CLK applied to a CLK input thereof from the master logic 46, the shift register 64, 66 advances that received BUSY signal to a next of the output terminals 82, 84 and applies the current BUSY signal state to the first output terminal.

The output terminals 82, 84 apply the output signals from the shift register 64, 66 to the NAND gate 68, 70, which supplies its output to the latch 72, 74. The latch 72, 74 serves to eliminate so-called switching transients that typically arise in outputs from the shift register 64, 66, and can be eliminated if such transients do not present difficulties. The output of the latch 72, 74 is applied to the respective BUSY driver 32A, 30A.

The operation of this circuit will now be explained. While the BUSY signal is deasserted on the originating bus 12, 14 to indicate that that bus is free, it has (due to the use of negative logic in the SCSI standards) a high voltage state, i.e., LOGIC ONE. After this condition has prevailed for some time, all of the outputs of the shift register 64, 66 are at LOGIC ONE, and the output of the NAND gate 68, 70 is LOGIC ZERO. Accordingly, the BUSY signal is not asserted by the BUSY driver 32A, 30A on the other bus 14, 12.

At the next clock tick after the BUSY signal becomes asserted on the originating bus 12, 14, the corresponding low voltage state (i.e., LOGIC ZERO) is received by the shift register 64, 66, which then has a DIGITAL ONE at the first output terminal 82, 84 and a LOGIC ZERO at all the rest. The output of the NAND gate 68, 70 goes to LOGIC ONE, and the BUSY signal is caused to be asserted by the BUSY DRIVER 32A, 30A onto the other bus 14, 12.

If the BUSY signal on the originating bus 12, 14 becomes deasserted again (i.e., returns to a LOGIC ONE), the shift register 64, 66 will continue to have a LOGIC ZERO at at least one of its output terminals 82, 84 until the LOGIC ONE input has propagated through all its "positions" (i.e., has been applied to all the output terminals 82, 84). If the BUSY signal is re-asserted before the LOGIC ONE has propagated through all the positions of the shift register 64, 66, the prior deassertion will therefore never appear on the other bus 14, 12.

To obtain a desired preset delay, it is only necessary to use a shift register 64, 66 with the appropriate number of output terminals 82, 84. For BUSY signals originating on the SE bus 12, five output terminals 82 can be used with a clock having a 50 nanosecond ticks to produce a delay of approximately 250 nanoseconds. For BUSY signals originating on the DIFF bus 14, seven output terminals can be used with that clock to produce a delay of 350 nanoseconds. Of course, the desired delay can be achieved by varying the clock period instead.

Figure 4:
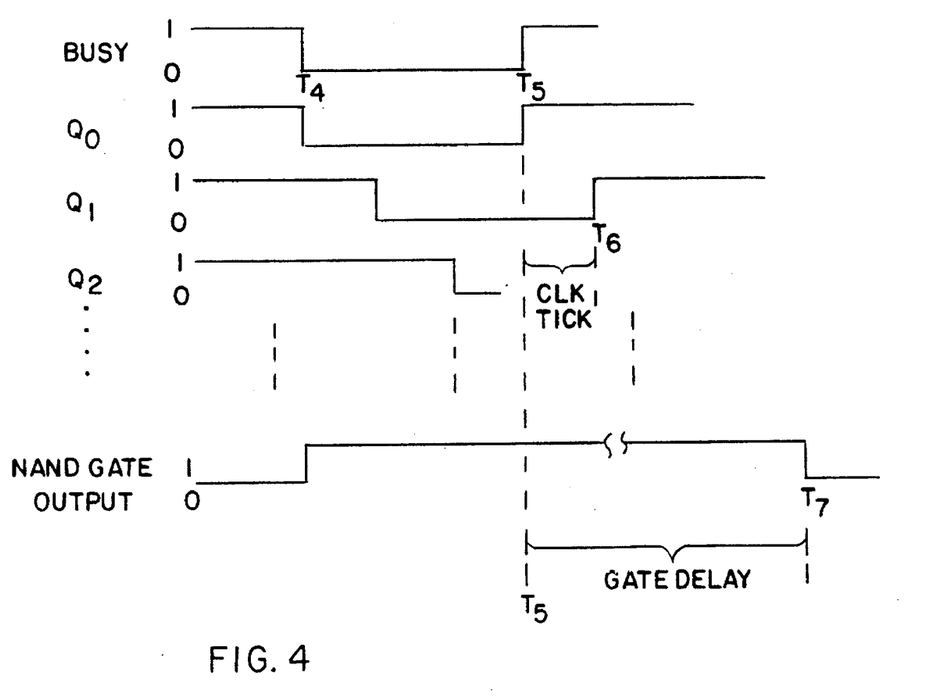

FIG. 4 shows a timing diagram for certain signals in the filter arrangement 50. The BUSY signal as applied to the input terminal 76, 78 of the shift register 64, 66 is asserted at time $T_4$, and is deasserted at time $T_5$. The output terminals 82, 84 are labeled $Q_0$, $Q_1$, etc. At time $T_4$, the state of $Q_0$ changes from LOGIC ONE to LOGIC ZERO. Each successive output terminal does the same, at intervals equal to a tick of the clock. At $T_5$, when the BUSY signal is deasserted, $Q_0$ goes to LOGIC ONE, followed in suit by $Q_1$ at time $T_6$, and then the other outputs $Q_1$, $Q_2$, etc. at successive clock ticks. The output of the NAND gate 68, 70 changes to LOGIC ONE at time $T_4$, and then changes back to LOGIC ZERO at time $T_7$. The period of time between $T_5$ (i.e., the time at which the BUSY signal is deasserted) and $T_7$ (i.e., the time at which the NAND gate output causes the other bus' BUSY signal to be asserted) is equal to the preset delay.

In alternative arrangements, equivalent devices can be substituted for the shift registers. Such devices may include, e.g., retriggerable "one-shot's". Other digital filtering schemes can be used as well, so long as only the trailing edge of the BUSY signal is delayed and not the leading or front edge, except for incidental propagation delays. Moreover, care must be taken in such arrangements not to cause actual deassertions of the BUSY signals to be missed since that would needlessly reduce throughput on the SCSI buses.

Figure 5:
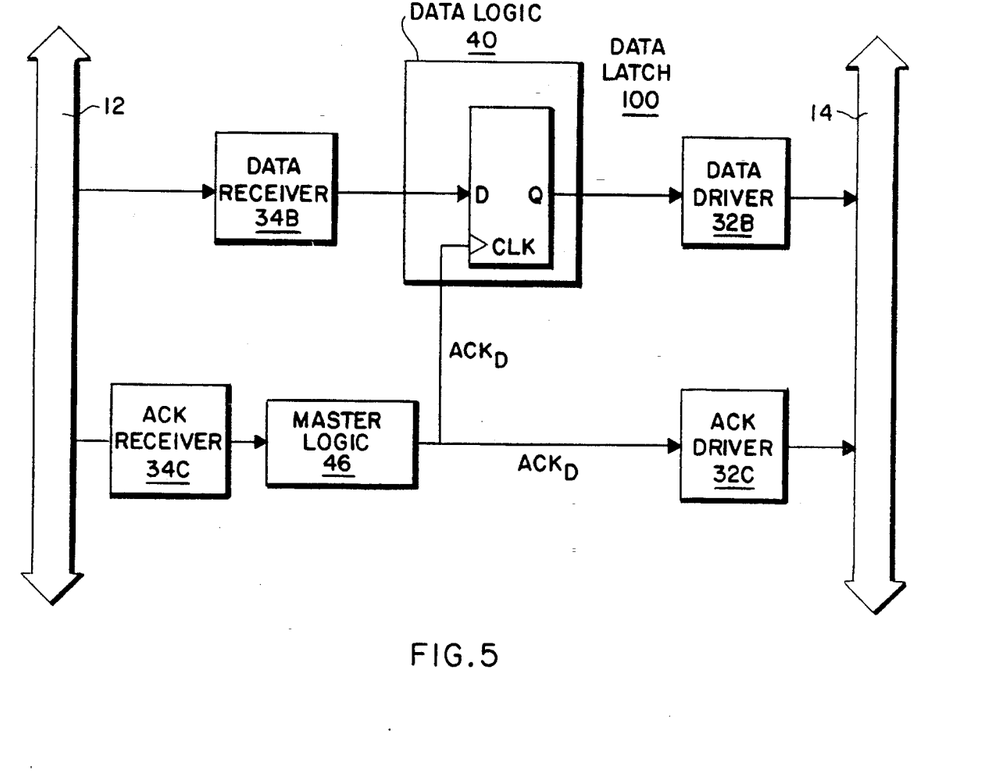
FIG. 5 is a block diagram of the DATA path and ACK path through the master logic unit of FIG. 1, showing a DATA and ACK timing arrangement.

Another aspect of the invention relates to the re-timing of the DATA, REQ and ACK signals. FIG. 5 shows the DATA logic and master logic units 40, 46 of FIG. 1 in greater detail in accordance with a preferred embodiment for re-timing the DATA and ACK signals.

As shown in the diagram of FIG. 5, the DATA logic 40 comprises a DATA latch 100, which receives, at a "D" input terminal, an incoming DATA signal from a DATA receiver 34B (connected to bus 12), and supplies, via a "Q" output terminal, an outgoing DATA signal to a DATA driver 32B (connected to bus 14).

The master logic unit 46 supplies a timing signal to the CLK input of the DATA latch 100. The supplied timing signal, or clock, is actually a delayed version of an ACKNOWLEDGE signal, or ACK, received by the master clock 46 from an ACK receiver 34C (connected to bus 12). The delayed ACK ("$ACK_D$") is also supplied to an ACK driver 32C for transmission over bus 12.

Figure 6:
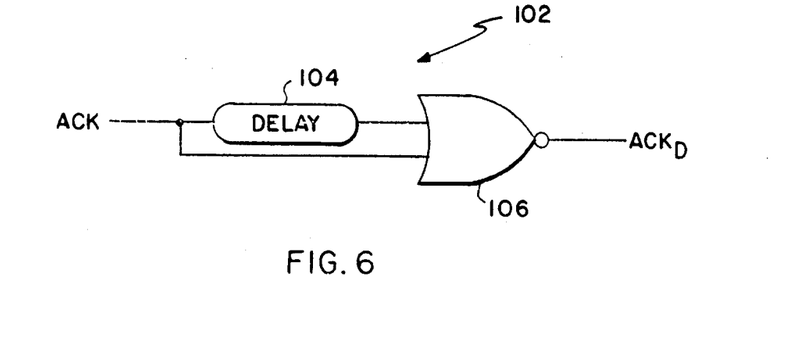
FIG. 6 is a schematic of a ACK delay circuit of the master logic unit of FIG. 5.

FIG. 6 shows a preferred implementation of a circuit 102 of the master logic unit 46 for generating the delayed ACK signal. The ACK signal received from the ACK receiver 34C is applied to a delay 104, e.g., a precision tapped delay line, whose output is applied to a first input terminal of a NOR gate 106. The received ACK signal is also directly applied to a second input terminal of The NOR gate 106. The output of the NOR gate is the delayed ACK signal.

By appropriately clocking the data signal out of the latch 100, the depicted arrangement of FIGS. 5 and 6 reregisters the DATA signal with the delayed ACK signals, thereby eliminating unwanted DATA skew (assuming the DATA signal was originally properly registered with the corresponding ACK or REQ signal upon transmission over the originating bus). This can be better understood from the timing diagrams of FIGS. 7 and 8.

Figure 7:
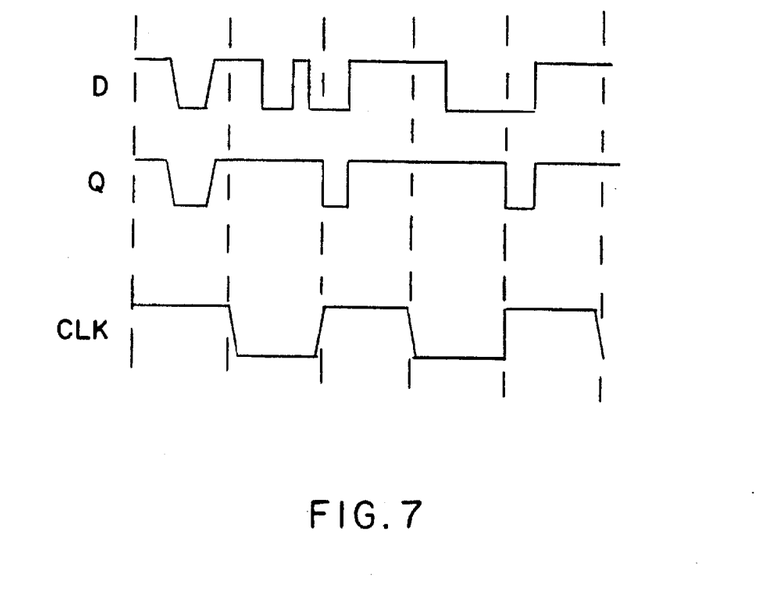
FIGS. 7 and 8 are signal timing diagrams for the DATA and ACK timing arrangement of FIG. 5.

FIG. 7 depicts the operation of the latch 100. It shows the incoming DATA and timing signals applied to the respective D and CLK input terminals of the latch 100, along with the outgoing DATA signal supplied by the Q output terminal thereof. As shown, the CLK signal includes a series of pulses having a HIGH value (LOGIC ONE), separately by a LOW value (LOGIC ZERO). When the CLK signal is HIGH, the signal at the Q output tracks the signal at the D input; however, when the CLK signal is LOW, the signal on the D input is latched onto its immediately prior state, and the signal on the Q output remains HIGH. This is in accord with the SCSI standards, which specify that DATA signal is valid on the "leading" edge of the ACK signal; accordingly, we are not concerned with the values of the DATA signal at other times. It should be understood that the incoming DATA signal in the diagram is but an example, and can be of any sequence of HIGH values and LOW values.

Figure 8:
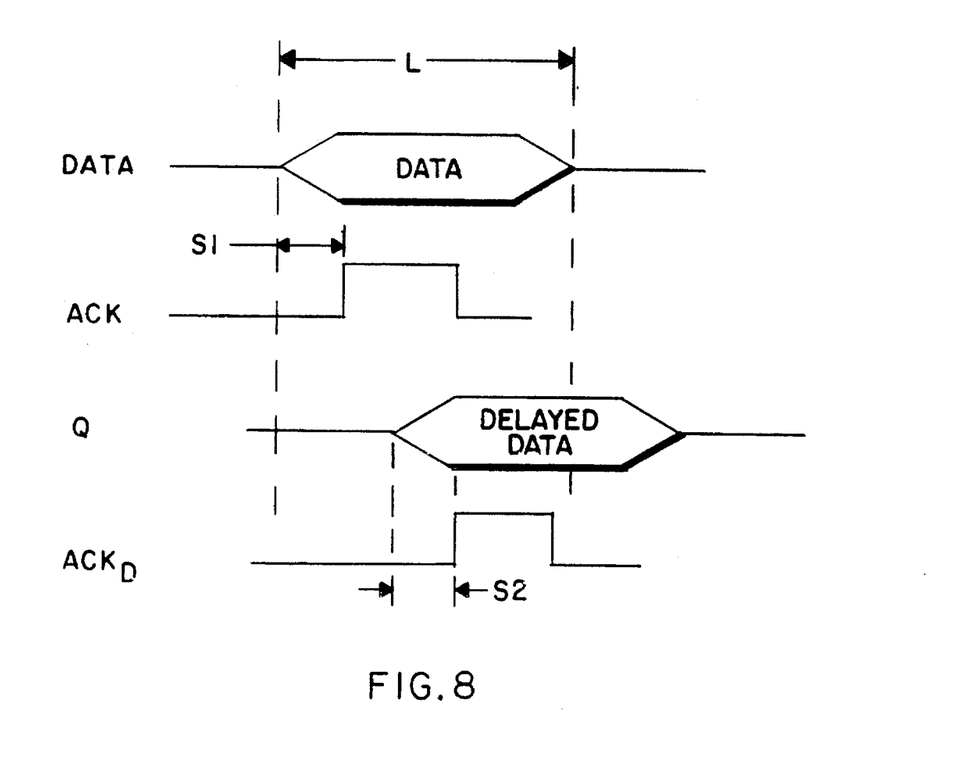

FIG. 8 shows an example of the relationship of the DATA, delayed DATA, ACK and delayed ACK signals. The DATA signal is of a length or duration "L" e.g., 100 nanosecond, and is offset or skewed from the ACK signal by a time period "S1" of approximately 50 nanoseconds. With this 100 nanosecond relationship, the adapter 10 may operate acceptably, However, if the DATA signal were shorter in length, e.g., 50 nanoseconds, and yet have this same 50 nanosecond difference S1 in start times with respect to the ACK signal, the DATA signal could be "missed" by the adapter 10.

Accordingly, the delayed DATA signal from the latch 100 is shown in FIGS. 7 and 8 as "re-registered" in accordance with the SCSI standards with the delayed ACK, so that the skew, designated "S2" is no more than, e.g., about 35 nanoseconds.

The desired S2 delay can be derived empirically for a typical SCSI application in which the adapter 10 is operating at a selected speed. More specifically, S2 is introduced by the latch 100 to compensate for the largest difference between the maximum time through the DATA path through the adapter 10 and the minimum time through the ACK path, with S2 being about 25 nanoseconds larger than this difference.

While FIG. 5 shows but a single DATA and ACK path, i.e., from bus 12 to 14, it can be appreciated from FIG. 1 that a second path from bus 14 to 12 is also provided in the adapter 12, and would contain a second arrangement analogous to FIG. 5, with a second latch 100, etc., and a second arrangement analogous to FIG. 6 for delaying the received ACK signal. By the same token, the adapter 10 also contains two more such arrangements analogous to FIGS. 5 and 6 for registering DATA signals with REQ signals in both directions, i.e., from bus 12 to bus 14 and from bus 14 to bus 12, depending on the originating bus for the incoming signal. Since these arrangements are the same as that depicted, with only the bus designations interchanged and signal designations appropriated renamed, they will not be separately shown, and need not be further described.

The foregoing description has been limited to a specific embodiment of this invention. It will be apparent, however, that variations and modifications may be made to this embodiment, with the attainment of some or all of the advantages of the invention. For example, aspects of the invention can be employed in other types of adapters, such as those that interconnect two differential buses or two single-ended buses, or two buses of which at least one complies with a protocol other than SCSI. Therefore, it is the object of the appended claims to cover all such variations and modifications as come within the true spirit and scope of the invention.

What is claimed as new and desired to be secured by Letters Patent of the United States is:

1. A bus adapter for interconnecting a first bus and a second bus, said bus adapter preventing a 'wired-or' glitch from being passed from said first bus to said second bus, said bus adapter comprising:

A) first transceiver means for receiving a plurality of first signals from said first bus;

B) second transceiver means for transmitting a plurality of second signals on said second bus;

C) filter means coupled with said first transceiver means for receiving said first signals, said received first signals including a plurality of asserted states and a plurality of deasserted states, wherein said filter means selectively suppresses each said deasserted state having a duration under a predetermined limit, thereby producing a plurality of filtered received signals; and D) supplying means coupled with said filter means and said second transceiver means for supplying said filtered received signals to said second transceiver means for transmission on said second bus as said second signals, whereby said bus adapter prevents transfer of a wired-or glitch in said received first signal from said first bus to said second bus.

2. The bus adapter in accordance with claim 1, wherein said filter and supplying means include:

A) first means coupled with said first transceiver means for passing said asserted states of said received first signals to said second transceiver means; and B) second means coupled with said first transceiver means for preventing said deasserted states of said received first signals from being passed to said second transceiver means when said durations of said deasserted states are less than said predetermined limit and for passing said deasserted states after said durations exceed said predetermined limit.

3. The bus adapter in accordance with claim 1, wherein said filter and supplying means comprise:

A) a shift register having an input terminal that receives said received first signals from said first transceiver means, a clock terminal that receives a clock signal comprising a plurality of pulses, and a plurality of output terminals; and B) logic means coupled with said output terminals of said shift register to receive a plurality of output signals therefrom, said logic means performing a NAND operation on said output signals of said shift register to generate said filtered received signals.

4. The bus adapter in accordance with claim 3, wherein

A) on each successive pulse of said clock signal, said shift register causes said received first signal then applied to said input terminal of said shift register to be applied to a first of said output terminals, and each of said output signals on said output terminals to shift to a successive one of said output terminals; and B) wherein, when said received first signals applied to said input terminal are in said asserted states, said logic means generates corresponding filtered received signals in asserted states, and after said received first signals applied to said input terminal next change from said asserted states to said deasserted states, the corresponding filtered received signals will continue to be asserted for a preselected number of said pulses of said clock signal.

5. The bus adapter in accordance with claim 1, wherein said first transceiver means is a single-ended transceiver means and said first bus is a single-ended bus, and said second transceiver means is a differential transceiver means and said second bus is a differential bus.

6. The bus adapter in accordance with claim 1, wherein said first transceiver means is a differential transceiver means and said first bus is a differential bus, and said second transceiver means is a single-ended transceiver means and said second bus is a single-ended bus.

* * * * *